March 8, 1949. A. J. SYNCK ET AL 2,463,726
MOWING MACHINE
Filed May 26, 1943 3 Sheets-Sheet 2
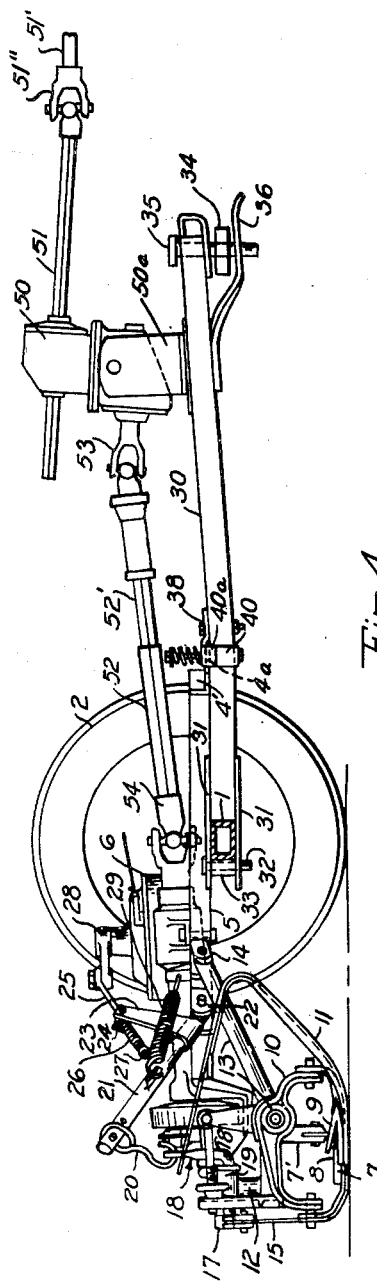

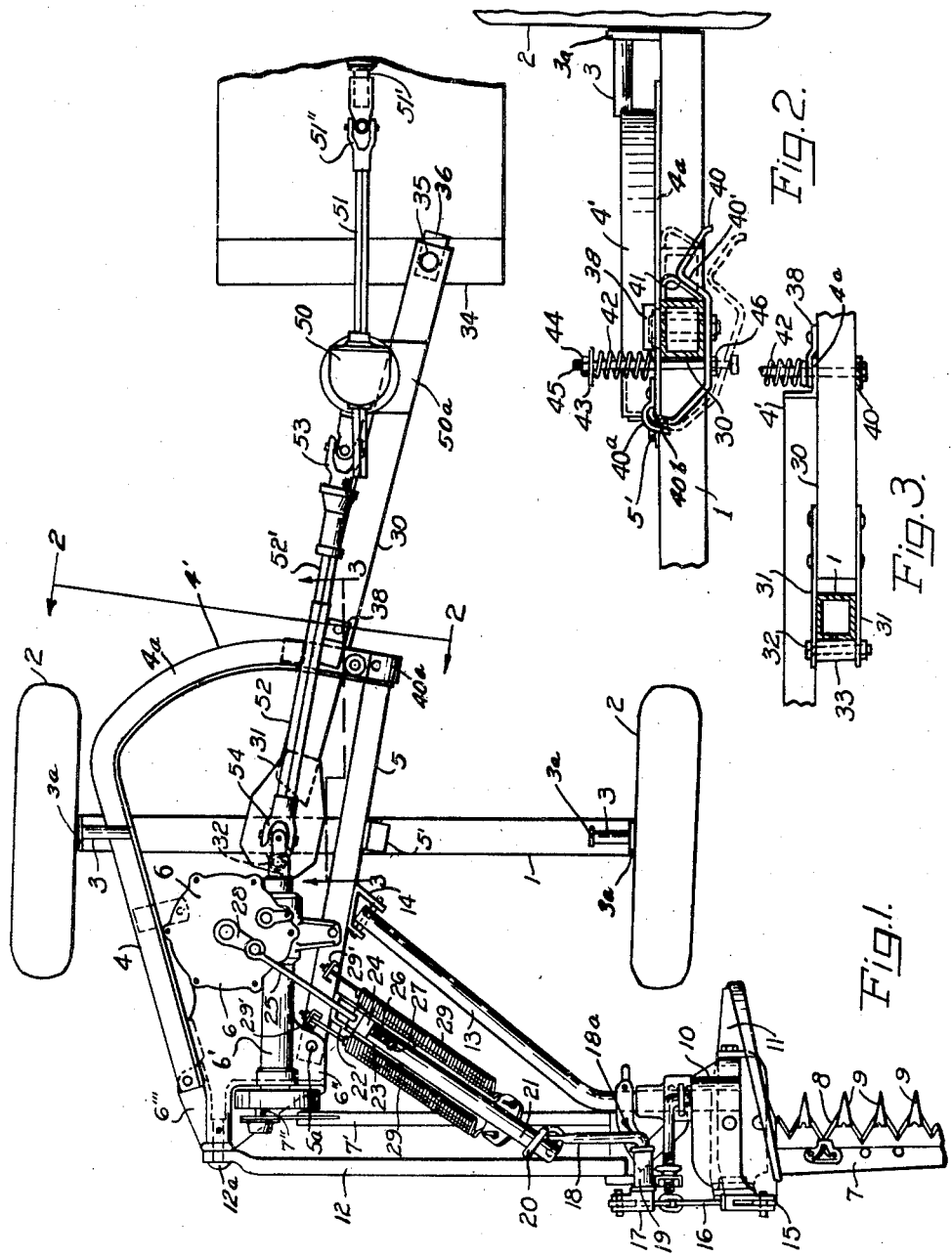

Patented Mar. 8, 1949

2,463,726

UNITED STATES PATENT OFFICE 2,463,726

MOWING MACHINE

Adolph J. Synck and Wilhelm Vutz, Coldwater, Ohio, assignors, by mesne assignments, to Avco Manufacturing Corporation, a corporation of Delaware Application May 26, 1943, Serial No. 488,482

1 Claim. (Cl. 56—25)

This invention relates to mowing machines and more particularly to the type of mower used with farm tractors.

A divisional application, Serial Number 22,967, was filed April 24, 1948, on the overload automatic release mechanism herein disclosed.

One of the objects of the invention is to provide a mower which is self-supporting and balanced on its carrying wheels so as to reduce the effort of coupling the mower to a tractor or moving it about when it is not in use.

Another object of the invention is to provide a mowing machine which is able to resist side draft resulting from the action of a heavily loaded cutter bar.

Other objects of the invention will appear from a consideration of the detailed description composed with reference to the accompanying drawings in which:

Fig. 1 is a top plan view of a mowing machine embodying the present invention and attached to a tractor only a portion of which is shown.

Fig. 2 is a vertical section view taken substantially on line 2—2 of Fig. 1.

Fig. 3 is a vertical section view taken substantially on line 3—3 of Fig. 1.

Fig. 4 is a side elevation view of the machine in Fig. 1 with the near ground wheel and its spindle removed.

Fig. 5 is a rear elevation view of the machine in Fig. 1.

Figure 6:
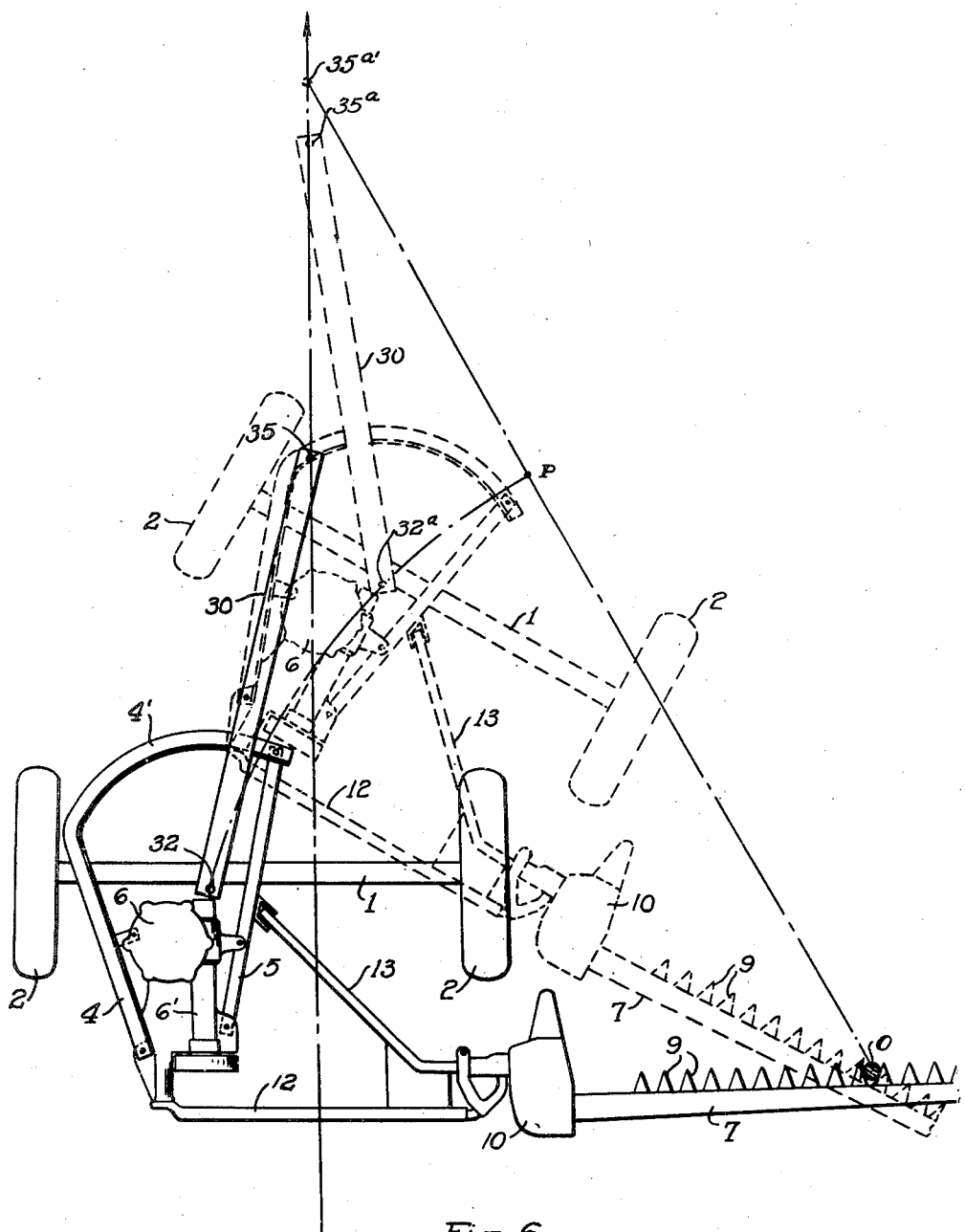
Fig. 6 is a diagrammatic view illustrating the movement of the mower elements when an obstruction is encountered by the cutter bar.

Referring to the drawings, 1 represents a hollow axle substantially square in cross section carried by a pair of wheels 2 rotatably mounted upon spindles 3 which are mounted in relatively spaced vertical brackets 3a projecting from the top of the axle 1. The axle 1 supports a frame comprising an angle member 4, fixedly secured to the axle and having a forward arcuate portion 4' provided with a horizontal flange 4a. Another frame member 5 is attached at its forward end to the arcuate portion 4' and at an intermediate point connected to the axle 1 by means of an angle plate 5'. The rearward end of frame member 5 is bolted at 5a to a flange 6'' provided on an extension 6' of a gear housing 6. The rear end of the angle member 4 is bolted or otherwise secured to an extension flange 6''' on the gear housing 6.

A conventional cutter bar 7 is provided with a reciprocating cutter 8 and guard fingers 9. The bar 7 is pivotally attached at 10a to a head 10 partially supported by a ground shoe 11. A brace rod 12 is pivotally attached at its inner end at 12a to the extension 6''' of the gear housing 6 and secured at its outer end to the head 10. Another brace rod 13 is pivoted at its inner end in a U-shaped bracket 14 fixedly secured to the frame member 5, and is rigidly connected at its outer end to the head 10.

An arm 15 for raising and lowering the cutter bar 7 is pivotally connected by a link 16 to one arm 17 of a crank 18a journalled in a bearing 19 supported by the head 10. The other arm 18 of the crank 18a is pivotally connected by a link 20 with the outer end of a lifter bar 21, the inner end of the bar being pivoted in a U-shaped bracket 22 attached to the frame member 5. The bar 21 is attached in the bottom of a U-shaped bracket 23 which extends upwardly from the bar 21 and carries at its upper end a swivel block 24 having a slidable link 25 loaded on the outer end with a coil spring 26 held in position by a keeper nut 27. The other end of the link 25 is pivotally connected with a crank arm 28 adapted to be driven from the power transmission housing 6 in any suitable manner, such for instance as by the drive mechanism shown in Higgins Patent 1,166,457, dated January 4, 1916. A pair of compensating and supporting springs 29 are adjustably connected between the outer end of bar 21 and bracket lugs 29' welded to the frame member 5. A driving pitman 7' is pivotally connected at one end to the cutter bar 7 and at the opposite end to a crank arm 7'' driven by the gearing within the housing 6.

A hollow rectangular draft tongue 30 is pivotally connected at one end to the axle 1, by means of a pair of plates 31 which straddle the axle 1 and are pivotally mounted upon a pin 32 carried by a sleeve 33 fixedly united to the axle 1. The forward end of the tongue 30 is connected to the draw bar 34, of a tractor, not fully shown, by a pin 35 extended through a clevis member 36, the tongue 30 and the tractor draw bar 34. The tongue 30 extends beneath the arcuate portion 4' of the frame member 4 in close proximity to the horizontal flange 4a and has secured thereto a guide plate 38 which is offset to overlie the horizontal flange 4a. The arcuate portion of the frame member 4' is shaped to the arc of a circle whose center is at the pin 32 for reasons which will appear later.

The tongue 30 is detachably connected to the frame portion 4' by an overload release mechanism including a latch 40 having one end bent to fit loosely into a rounded recess 40b in a plate 40a, fixedly secured to the horizontal flange 4a of the arcuate frame portion 4'. The latch 40 has an inclined portion 40' which is urged into engagement with a cam 41 fixedly secured to the tongue 30, by resilient means including a bolt 45, having a head 46, extended through the horizontal flange 4a and the latch 40, and loaded on the upper end with a coil spring 42 held in position by a retaining washer 43 and an adjusting nut 44.

A second gear housing 50 is pivotally supported by a bracket 50a on the forward end of the tongue 30 for fore and aft oscillation so as to assist in adjusting for any relative vertical movement between the mower and the draft tractor. A driven shaft 51 is connected, by means of a universal joint 51'', to a power take off shaft 51' and extended into the upper portion of the gear housing 50. A telescopic drive shaft has a driven member 52' connected by a universal joint 53 with the gearing in the lower part of the housing 50 and a driving member 52, connected by a universal joint 54, with the gearing in the housing 6. The gearing in the housing 50 is not shown since it does not, per se, form any part of the instant invention, but does form the subject matter of a copending application for Letters Patent of Wilhelm Vutz, Serial No. 495,855, filed July 23, 1943, now Patent No. 2,421,044. This arrangement affords added flexibility to the driving mechanism and assists in balancing the weight of the machine upon the axle 1.

In the construction described, it will be seen that supporting means, such as feet, are unnecessary as the mower parts are so disposed about the axle 1 that the mower is substantially balanced on its carrying wheels 2 so that it can be readily coupled to the tractor and be easily wheeled around when not in use.

Such balance is accomplished by properly arranging the major elements of the mower, namely, the cutter bar, gear housings and draft tongue, to the front and rear of the axle. It should be understood therefore that the applicants' invention is not limited to mowers having a cutter bar at the rear of the axle.

This balanced construction provides a mower which is able to effectively withstand the side draft produced by a heavily loaded cutter bar. With fully mounted and semi-mounted tractor mowers, this side draft is all absorbed by the tractor; accordingly, the magnitude of the side draft resulting from the use of long cutter bars is often such that it is difficult to steer the lighter weight tractors. Therefore, the applicants' mower structure, in which the cutting mechanism is largely supported by the ground, provides a high degree of lateral stability thereby making it especially suitable for use with light weight tractors.

The mower structure provides an overload release which will permit the entire machine, with the exception of the tongue and some parts of the power take-off device, to swing around an obstruction, when one is encountered by the cutter elements, without disconnecting the machine from the tractor.

In Fig. 6 there is shown diagrammatically the release principle involved. The solid lines indicate the normal operating position of the mower and the broken lines the released position. When an obstruction O is encountered, the tractor can travel forward the distance from 35 to 35a without any appreciable tendency to move the rear end of the tractor to the right or the obstruction O to the left. The limit of free movement is reached only as the pivot 32a, in its arcuate travel around the obstruction O, reaches a point P on a straight line between the obstruction O and the point 35a'. Up to this fully extended position the same guard finger remains in contact with the obstruction O and the mower and cutter bar will roll and swing freely around the obstruction O. To recouple the release mechanism after the obstruction has been passed, it is only necessary to back up the tractor until the mower is in the normal operating position where latch 40 will again engage the cam 41 so as to lock the tongue 30 to the arcuate frame member 4'.

Having thus described our invention, we claim:

In a tractor-powered, trailer-type mower adapted to be drawn by a tractor having a power take-off, a wheeled axle, a frame fixedly mounted on the axle, a cutter mechanism supported by the frame rearwardly of the axle, a lifting transmission housing mounted on the frame rearward of the axle, a draft tongue pivoted on the axle and extended forwardly thereof and engaging said frame forwardly of said axle, a power transmission supported on the tongue, and flexible shafting connecting the power transmission to the power take-off of said tractor, the interconnected parts comprising said housing, tongue, transmission and shafting balancing the mower weight about the wheeled axle.

ADOLPH J. SYNCK.
WILHELM VUTZ.

REFERENCES CITED

The following references are of record in the file of this patent:

UNITED STATES PATENTS

| Number | Name | Date |
| --- | --- | --- |
| 67,883 | Kniffen | Aug. 20, 1867 |
| 108,069 | Wagner | Oct. 1, 1870 |
| 1,487,622 | Thomas | Mar. 18, 1924 |
| 1,569,878 | Pearson | Jan. 19, 1926 |
| 1,745,069 | Wallace et al. | Jan. 28, 1930 |
| 1,829,934 | Imus | Nov. 3, 1931 |
| 1,923,952 | Pearson | Aug. 22, 1933 |
| 1,974,410 | Caughey | Sept. 25, 1934 |
| 2,155,716 | Korsmo et al. | Apr. 25, 1939 |
| 2,269,980 | MacDonald | Jan. 13, 1942 |
| 2,305,959 | Frederiksen | Dec. 22, 1942 |
| 2,328,838 | Oberlink | Sept. 7, 1943 |
| 2,375,912 | Gifford et al. | May 15, 1945 |